April 10, 1934.    A. L. AICHER    1,954,466
WATER GAUGE
Filed Jan. 7, 1931

Inventor
Alfred L. Aicher
by
Attorney.

Patented Apr. 10, 1934

1,954,466

UNITED STATES PATENT OFFICE 1,954,466

WATER GAUGE

Alfred L. Aicher, Philadelphia, Pa., assignor to Yarnall-Waring Company, Philadelphia, Pa., a corporation of Pennsylvania Application January 7, 1931, Serial No. 507,176

7 Claims. (Cl. 73—54)

My invention relates to a gauge believed to have its widest application as a water gauge for continuously showing the water level within a steam boiler or the like, and relates to the type of gauge that presents a column of water and steam to view through transparent plates, usually front and rear glass plates held to place over a vertical slot in an intermediate metal structure that cooperates with the plates to form a vertical conduit having pipe connections at top and bottom into the boiler or the like (herein designated boiler) above and below the water line.

A purpose of my invention is to provide a gauge of the character indicated, adapted to easy and inexpensive manufacture and well suited to the needs of service.

A further purpose is to lengthen the effective transparency life of the glass plates and mica sheets of a gauge of the character indicated, that is to increase the length of time during which the plates are adapted to effectively disclose the water level of the column.

A further purpose is to avoid or greatly lessen the engagement of steam condensate upon the inwardly presented surfaces of the glass plates and mica sheets of a gauge of the character indicated.

A further purpose is to vertically by-pass a gauge column of the character indicated by a direct conduit connection between the steam and water inlet openings, using the by-pass to trap condensate that would otherwise engage and cloud the surface of the glass and mica of the column.

A further purpose is to place upper and lower gauge compartments of the character indicated upon opposite sides of a conduit by-passing both compartments, preferably vertically overlapping the compartments so as to provide simultaneous indication in both compartments at the normal range of water levels.

A further purpose is to direct as much of the steam condensate as possible through the vertical conduit, thus eliminating in its direct passage the wearing action upon the mica facing.

Further purposes will appear in the specification and in the claims.

I have elected to show two only of the different forms of my invention, selecting forms however that are practical and efficient in operation and which well illustrate the principles involved.

Like numerals refer to like parts in all figures.

Figure 1:
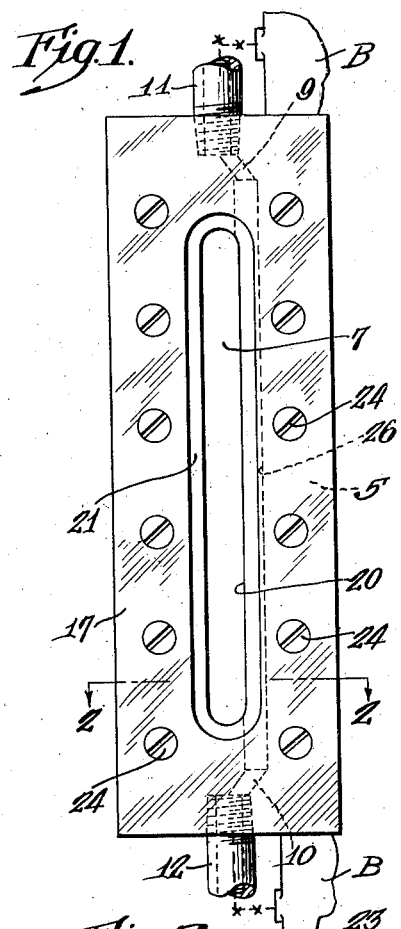
Figure 1 is a front elevation of the single gauge type of structure embodying a desirable form of my invention illustrated diagrammatically as connected to a boiler.

Describing in illustration and not in limitation and referring to the drawing:—

The gauge shown in Figure 1 comprises a central metal body 5, slotted vertically at 6 for an intermediate portion of its length, the slot having front and back glass covers 7 and 8 and at top and bottom conduit inlets 9 and 10 respectively to pipes 11 and 12 leading into a boiler B, or the like, above and below the water level therein.

The body is recessed at 13 and 14 around opposite sides of the slot to provide seats for gaskets 15 and 16, glass plates 7 and 8 and mica sheets 25 which loosely fit the recesses and are held to position upon the gaskets by cover plates 17 and 18 slotted at 19 and 20 in registry with the slots of the body and preferably outwardly flaring at 21 to better admit the light and vision to the glass covered column.

The cover plates are desirably recessed at 22 around the slot to loosely fit the glass plates, suitable gaskets 23 being placed between the metal cover plates and the glass plates, and the cover plates are clamped together upon the intermediate members by suitable fastenings such as bolts, studs or screws 24. The intermediate members include the gaskets 23, the glass plates 7 and 8, the mica sheets 25, the gaskets 15 and 16 and the body 5.

Water gauges having back and front glass plates such as 7 and 8 held in position over a vertical slot by back and front cover plates 17 and 18 are old in the art, as is also the use of gaskets on each side of the glass plates.

Gauge glasses of this character have in the past however given a good deal of trouble from loss of transparency due to clouding at the interior surface of the glass, the gauges being very satisfactory when new but with use becoming gradually so clouded as to make their indications more and more uncertain and finally invisible.

With the advent of higher steam pressures and temperatures, the mica facing has been found to be a good protection to the glass surfaces, but with steam pressures and temperatures still on the increase, it is advantageous to by-pass the direct flow through the gauge column causing the same to flow through a separate conduit, thus eliminating the pounding effect upon the mica and glass.

My invention is directed to lessening the early clouding of the inside of the mica and glass, principally by lessening the quantity of flow of condensate that engages the interior surface of the mica.

I provide a longitudinal conduit 26 between the upper and lower connections 9 and 10, the conduit or bore being offset from and by-passing the downwardly flowing condensate from the visible column between the glass plates 7 and 8.

In Figure 1 the conduit 26 is connected laterally with the visible column along the length of the column and catches the condensate from steam piping above the gauge, thereby preventing this condensate from flowing directly over the interior of the mica sheets 25.

Figure 3:
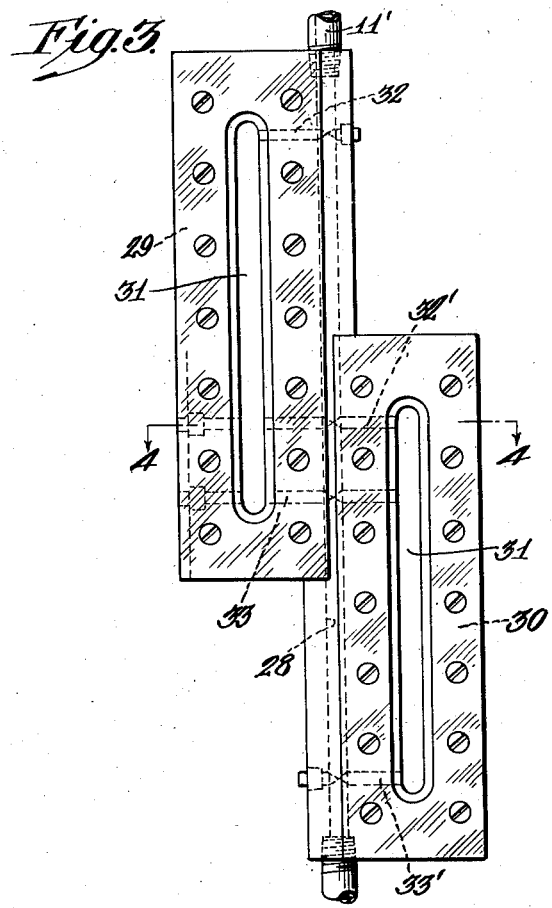
Figure 3 is a front elevation of the double gauge type of structure, the view corresponding to Figure 1 but showing a somewhat different form.
Figure 4:
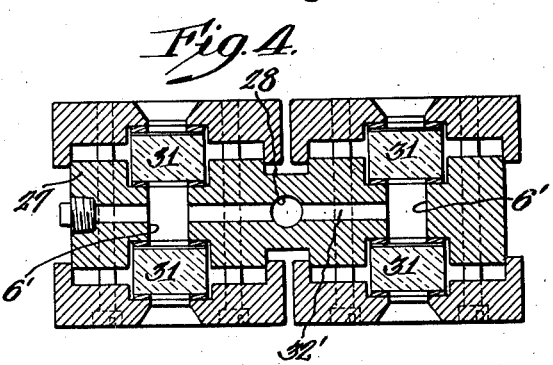
Figure 4 is an enlarged horizontal section taken upon the line 4—4 of Figure 3.

In my preferred form illustrated in Figures 3 and 4, the body 27 is bored longitudinally at 28 and is provided with upper and lower step portions 29 and 30 upon opposite sides of the bore.

Figure 2:
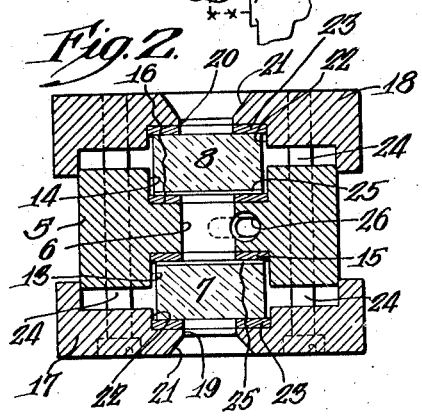
Figure 2 is an enlarged section taken upon the line 2—2 of Figure 1.

Each step portion is vertically slotted at 6' to provide an interior for a gauge section, the slots covered with glass plates 31 exactly as already described in the gauge illustrated in Figures 1 and 2.

The slots are connected to the bore at top and bottom at 32 and 33 or 32' and 33', and preferably have considerable vertical overlap, to insure continuous vertical visibility.

An overlap is used for this purpose and the gauge is placed so that the middle of the overlapping portions of the gauges is at about the normal water level, so that normal water levels show simultaneously in both gauges.

This has an additional advantage that the portion of the gauge most used and soonest clouded is visible simultaneously on both columns.

Another very great advantage of the gauge shown in Figures 3 and 4 lies in the fact that condensate from the steam pipe 11' at the top goes down the by-passing bore 28 and does not flow upon the portion of the gauge containing the glass.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. In a water gauge, a metal body vertically slotted through its thickness for an intermediate portion of its length, having conduit inlets to the slot respectively, near the top and bottom thereof and having a conduit between the inlets by-passing the slot, in combination with transparent plates held to place over the front and over the back of the slot and cooperating with the walls of the slot to form a water passage open to vision or light at front and rear through the respective plates.

2. In a gauge of the character indicated, a body longitudinally perforated for connection at top and bottom respectively to points above and below the water of a boiler, the body having laterally spaced vertical slots through its thickness on opposite sides of the longitudinal perforation and transparent cover plates held to place over opposite sides of the slots, each slot having a connection at its top and bottom respectively to the conduit.

3. In a gauge of the character indicated, a body longitudinally perforated for connection at top and bottom respectively to points above and below the water of a boiler, the body having laterally spaced vertical slots through its thickness on opposite sides of the longitudinal perforation and transparent cover plates held to place over opposite sides of the slots, each slot having a connection at its top and bottom respectively to the conduit, and one slot vertically overlapping the other.

4. In a water level indicator, walls containing a vertically extending passage connected above and below to the body in which the water level is to be indicated, a plurality of water gauges having transparent reading faces, one gauge extending above another and the other gauge extending below the one, with intermediate overlapping portions and lateral connections from the vertical passage to the tops and bottoms of the respective gauges.

5. In a boiler water level indicator, a metal body vertically slotted and having a vertical passage to one side of the vertical slot laterally communicating with the vertical slot at the top and bottom of the slot, a transparent plate on the front of the slot, a transparent plate on the back of the slot and connections from the top and bottom of the vertical passage to a boiler or the like.

6. In a boiler water level indicator, a metal body having laterally spaced overlapping vertical slots, one extending above another and the other extending below the one, walls forming a vertical passage through the body to one side of each vertical slot, laterally communicating with each slot at the top and the bottom of each slot, a transparent plate on the front of each slot, a transparent plate on the back of each slot and connections from the top and the bottom of the vertical passage to a boiler or the like.

7. In a boiler water level indicator, a metal body having laterally spaced overlapping vertical slots, one extending above another and the other extending below the one, walls forming a vertical passage through the body to one side of each vertical slot, and between the vertical slots, laterally communicating with each slot at the top and the bottom of each slot, a transparent plate on the front of each slot, a transparent plate on the back of each slot and connections from the top and the bottom of the vertical passage to a boiler or the like.

ALFRED L. AICHER.